R. E. STRAIT.
Pump.
No. 9,327. Reissued Aug. 3, 1880.
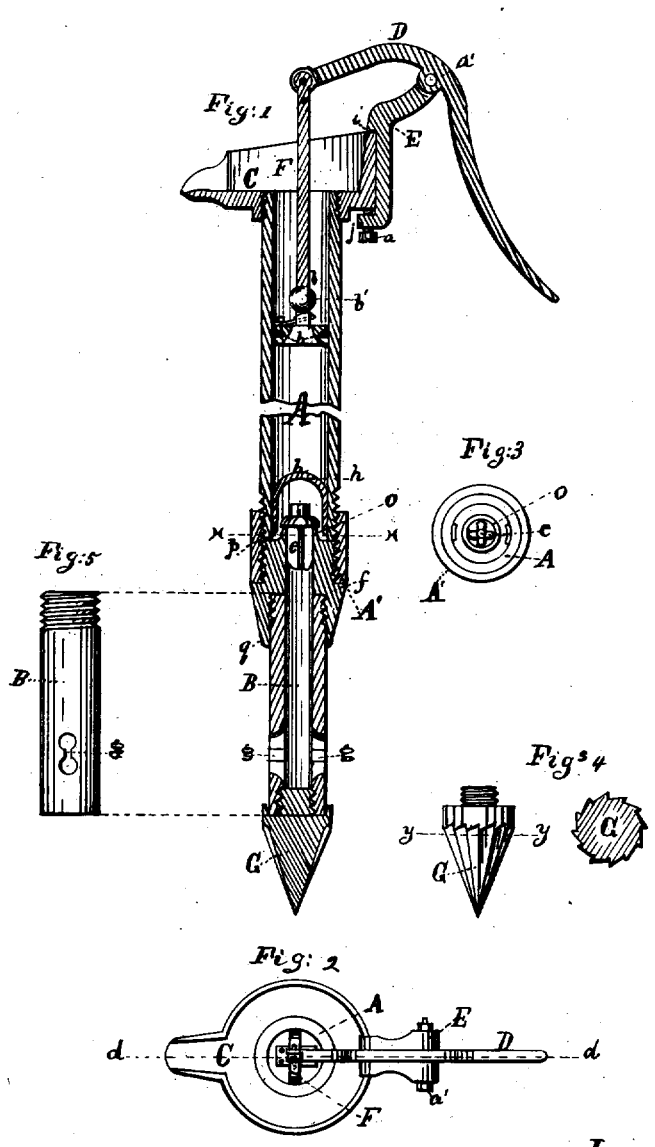
Attest:
J. A. Perkins
James H. Hopkins.
Inventor:
Ransom E. Strait.
Per: Lucius C. West
Atty.
N. PETERS, PHOTO-LITHOGRAPHER, WASHINGTON, D. C.

UNITED STATES PATENT OFFICE.

RANSOM E. STRAIT, OF GALESBURG, MICHIGAN.

PUMP.

SPECIFICATION forming part of Reissued Letters Patent No. 9,327, dated August 3, 1880.

Original No. 70,285, dated October 29, 1867. Application for reissue filed November 20, 1879.

*To all whom it may concern:*

Be it known that I, RANSOM E. STRAIT, of Galesburg, in the county of Kalamazoo and State of Michigan, have invented certain new and useful Improvements in Pumps; and I do hereby declare that the following is a full, clear, and exact description thereof, reference being had to the accompanying drawings, and to letters of reference marked thereon, in which—

Figure 1 is a vertical section through the complete pump. Fig. 2 is a top view. Fig. 3 is a horizontal section through the line *x x* in Fig. 1. Fig. 4 is a side view and horizontal section of the conical burr. Fig. 5 is a side view of the lower pipe detached.

The nature of my invention consists in the devices for joining two tubes of unequal size together, and of the construction and arrangement of the parts connected with the valve, valve-seat, spout, and handle, as hereinafter set forth.

To enable others skilled in the art to make and use my invention, I will proceed to describe its construction and operation.

In the construction of my invention, in Fig. 1 A is the upper and larger pipe; B, the lower and smaller pipe; C, the spout; D, the handle; E, the bearing or fulcrum of handle; *a*, screw for attaching the same to the spout; F, the piston-rod; *b*, the packing; *b'*, ball-valve; *h*, the movable arch-spring; *e*, the valve of metal with four flanges ground to an edge, each, to prevent the sand from catching in it; *f*, the joint, which is screwed into the joint A' of the pipe or barrel of the pump; *g g*, holes and slots in the pipe B; G, the conical burr, for cutting and boring, attached to the pipe B. *o* represents the raised valve-seat surrounded by the space *p*, lying below the face of the valve-seat.

The same letters in Figs. 2, 3, 4, and 5 represent like parts as in Fig. 1.

In Fig. 4 the cutting-burrs are shown of the conical point G, both vertically and in cross-section.

In constructing the joint *f*, it will be seen in Fig. 1 that that portion *o* on which the valve sets is allowed to project some distance above the main body of the joint *f*, so that if any sand or similar substance be carried up above the valve-seat it may fall over its edge and not lodge on it. The shoulder of this joint is made to fit snugly up against the lower end of barrel A by being first screwed into joint A', and the joint A' being screwed tightly onto barrel A, as seen in Fig. 1, causing the shoulder of joint *f* to fit up against barrel A. The smaller pipe B is then screwed into joint *f*, the orifice in the lower end of the joint *f* being threaded only on the upper portion, leaving an extension, *q*, which embraces the upper part of the tube B below its threaded part, thus preventing the liability of the breakage of the tube at its threaded portion. The conical point G, with cutting-burrs, is screwed onto said pipe B.

It will be seen in Fig. 1 that the spout is made with an open cup, the cup and spout being made of one piece, and is screwed onto the upper end of barrel A, allowing the water to flow into the cup freely and out of the spout C without any obstruction.

The handle D is attached to the bearing or fulcrum E by a screw-bolt, *a'*, and this fulcrum E has a hooked projection, *i*, which fits snugly down on the top of the spout or cup C, and a projection, *j*, on its lower end, that passes under the cup, through the hole in which passes screw *a*, and which, when screwed up, causes the fulcrum to be firmly attached to the cup or spout C. The valve in this pipe A may be a ball-valve, as seen at *b'* in Fig. 1, or a spring-valve.

The lower valve, *e*, is made with four flanges, as seen in Fig. 3. Each flange is ground to an edge to prevent any gravel or like substance from lodging in it. The top projects over the flange far enough to cover the valve-seat, and is ground to fit the seat, thus forming a complete valve at the head of the smaller pipe or barrel of the pump. The arch-spring *h* is to prevent this valve *e* from being raised out of its position, and is pushed down the barrel from the top.

This pump can be increased to any required length by admitting an additional joint or joints in the barrel A, as shown, where the barrel may be broken in Fig. 1 by a broken line across the barrel A.

The barrel being of the same size down to the valve *e*, I can take out the suction-rod, valve, and spring, if desired, and repair them, or any of them, without raising the barrel or pump.

The joint *f* I call a reducing-socket, as it is made wider at the top of the orifice than at the bottom, thus making it correspond at both ends with the pipes A and B, and to let the water flow freely in passing the valve *e*. The holes and slots between them are to admit the water into the pipe B. These holes and slots are connected with each other and are placed on each side. Their number can be increased, if desired, and they are made larger on the inside than on the outside, so that nothing of a hard substance will be retained in them, as whatever passes into them must go through into the pipe or barrel of the pump.

In the operation of my invention, having constructed the parts as described, it is driven into the earth or twisted as an auger, boring its way, by means of the conical burr-cutting point G, to the required depth. When the spout is arranged as described, the rod and valve *b'* inserted, and the handle arranged, it is ready for use. When the handle is raised the valve *e* is closed; but by depressing the handle the water is caused to ascend past the valve into the barrel, and thence through the valve *b* on the next descent of the latter, and is forced up to the cup, and at the next rise of the piston runs off at the spout C. The valve *e* then closes and holds in pipe A all the water above it until another stroke is made with the handle, when another supply of water is brought up, while the water above is carried up, as before, and runs off at the spout C. This operation is continued, and I am able to raise water to a very great height with ease and facility.

I am aware that a raised valve-seat is not new, and I therefore lay no claim to a raised valve-seat *per se*.

Having thus described the construction and operation of my invention, what I claim as new, and desire to secure by Letters Patent, is—

1. The joint *f*, provided with a cylindrical screw-threaded recess at its lower end and a central orifice extending longitudinally from the upper end of said recess through the joint and terminating at its upper end in a fixed raised valve-seat, forming the upper edge of the orifice, with a space below, forming a part of the joint and surrounding the upper face of said valve-seat, and having a screw-threaded fastening at its upper end of larger diameter than the screw-threaded recess at its lower end, in combination with the tubes A B, of different diameters, the tube A being screw-threaded at its lower end and the tube B screw-threaded at its upper end, substantially as described, and for the purpose set forth.

2. The joint *f*, provided with an orifice interiorly screw-threaded at its lower end and having an extension, *q*, projecting below the screw-threads of the lower tube, in combination with the tube B, screw-threaded at its upper end, substantially as described, and for the purpose set forth.

3. The combination of the spout C, fulcrum E, provided with a hooked projection, *i*, fitting over the cup C, and a perforated projection, *j*, at its lower end, and screw *a*, substantially as described, and for the purpose set forth.

RANSOM E. STRAIT.

Witnesses:
JAMES W. HOPKINS,
WILLIAM BALLANTINE.